(12) United States Patent
Valentin

(10) Patent No.: US 10,215,490 B1
(45) Date of Patent: Feb. 26, 2019

(54) KICK STAND SYSTEM AND METHOD

(71) Applicant: Bryan Valentin, Rosedale, NY (US)

(72) Inventor: Bryan Valentin, Rosedale, NY (US)

( * ) Notice: Subject to any disclaimer, the term of this patent is extended or adjusted under 35 U.S.C. 154(b) by 535 days.

(21) Appl. No.: 14/874,370

(22) Filed: Oct. 2, 2015

Related U.S. Application Data

(60) Provisional application No. 62/059,896, filed on Oct. 4, 2014.

(51) Int. Cl.
*F26B 5/04* (2006.01)
*F26B 5/00* (2006.01)
*F16M 13/02* (2006.01)

(52) U.S. Cl.
CPC ............. *F26B 5/00* (2013.01); *F16M 13/022* (2013.01)

(58) Field of Classification Search
CPC ................................ F26B 5/00; F16M 13/022
USPC .... 34/413; 211/1.53, 70, 77, 78, 115, 131.1, 211/163, 165, 166
See application file for complete search history.

(56) References Cited

U.S. PATENT DOCUMENTS

| | | | |
|---|---|---|---|
| 3,700,176 A | 10/1972 | Haber | |
| 4,042,221 A * | 8/1977 | Myers | B01F 7/161 366/146 |
| 4,928,841 A * | 5/1990 | Arthurs | B65D 71/70 206/203 |
| 5,249,369 A * | 10/1993 | Mallet | F26B 21/008 34/104 |
| 5,287,636 A * | 2/1994 | Lafleur | A47L 23/205 239/565 |
| 5,469,635 A * | 11/1995 | Lamontagne | F26B 21/006 34/104 |
| 5,836,687 A * | 11/1998 | Khalid | A21C 1/02 366/207 |
| 5,943,786 A * | 8/1999 | Stahley | F26B 21/006 211/41.3 |
| 7,690,835 B2 | 4/2010 | Schnipke et al. | |
| D615,715 S * | 5/2010 | Zielinski | A47K 10/06 D32/8 |
| 7,717,613 B1 * | 5/2010 | Epps | A47J 43/042 366/205 |
| 8,469,586 B2 * | 6/2013 | Schleinzer | A47J 43/046 366/202 |
| 2010/0038462 A1 * | 2/2010 | Kolar | A47J 43/0716 241/285.3 |
| 2014/0373755 A1 * | 12/2014 | Forgeron | B29B 7/603 106/638 |

* cited by examiner

*Primary Examiner* — John McCormack
(74) *Attorney, Agent, or Firm* — Michael J. Feigin, Esq.; Feigin and Fridman LLC

(57) ABSTRACT

An accessory stand system for use with blender stand and blender pitcher. In this system, one or more posts are deattachably attached and extended from blender stand. In addition, one or more pegs are pivotally, deattachably attached along a length of one or more posts and one or more sides of blender pitcher.

20 Claims, 5 Drawing Sheets

KICK STAND SYSTEM AND METHOD

CROSS-REFERENCE TO RELATED APPLICATION

The present application is related to and claims priority from prior provisional application Ser. No. 62/059,896, filed Oct. 4, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of accessory stands and more specifically relates to electric blender stands which facilitate easier pouring from the pitcher and easier drying when the pitcher has been washed.

2. DESCRIPTION OF THE RELATED ART

An electric blender is designed for health-conscious consumers who prepare fruit smoothies, protein drinks, and other nutritious beverages. There are common problems shared by existing electric blenders. First, the tall, heavy blender pitcher is cumbersome, making it difficult to pour without spilling the contents. And second, because the blender pitcher has sharp blades in the bottom, it is both difficult and hazardous to dry with a dish-towel. These problems are not desirable for consumers.

Various attempts have been made to solve problems found in accessory stand art. Among these are found in: U.S. Pat. No. 3,700,176 to Norman Haber et al; U.S. Pat. No. 4,042,221 to Gary A. Myers; and U.S. Pat. No. 7,690,835 to Brian E. Bader. This prior art is representative of accessory stands.

None of the above inventions and patents, taken either singly or in combination, is seen to describe the invention as claimed. Thus, a need exists for a reliable blender accessory stand to facilitate easier pouring from the pitcher and easier drying when the pitcher has been washed and to avoid the above-mentioned problems.

BRIEF SUMMARY OF THE INVENTION

In view of the foregoing disadvantages inherent in the known blender accessory art, the present invention provides a novel accessory stand, i.e., Kick Stand, would be used with a variety of existing electric blenders, or incorporated into the production of new blenders. Kick Stand would facilitate easier pouring from the blender pitcher when drinks have been prepared, and easier drying when the pitcher has been washed. The general purpose of the present invention, which will be described subsequently in greater detail, is to provide a pivoting blender pitcher pouring and cleaning accessory.

An accessory stand system is disclosed for use with a blender stand and blender pitcher. In this system, one or more posts are deattachably attached and extended from the blender stand. In addition, one or more pegs are pivotally, deattachably attached along a length of the one or more posts and one or more sides of the blender pitcher.

A method is disclosed of pivoting a blender pitcher within a blender stand. In this method, an accessory stand system is installed for use with a blender stand and blender pitcher. In this method, one or more posts are deattachably attached and extended from the blender stand. Furthermore, one or more pegs are deattachably attached along a length of the one or more posts and one or more sides of the blender pitcher.

The present invention holds significant improvements and serves as a pivoting blender pitcher pouring and cleaning accessory. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pivoting blender pitcher pouring and cleaning accessory, i.e., Kick Stand, constructed and operative according to the teachings of the present invention.

The various embodiments of the present invention will hereinafter be described in conjunction with the appended drawings, wherein like designations denote like elements.

DETAILED DESCRIPTION

Figure 1:
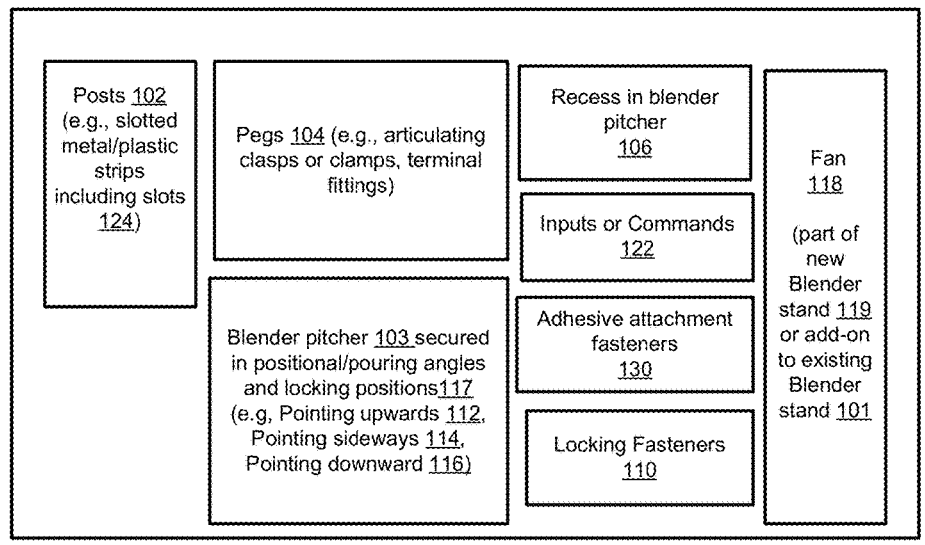
FIG. 1 shows a schematic view illustrating pivoting blender pitcher pouring and cleaning accessory, i.e., Kick Stand, according to an embodiment of the present invention.

As discussed above, embodiments of the present invention relate to an accessory stand device and more particularly to an electric blender stand as used to improve pouring from the pitcher and easier drying when the pitcher has been washed.

Referring now to the drawings FIGS. 1-8, showing a countertop stand and a dedicated glass blender pitcher.

Generally speaking, Kick Stand would hold the blender pitcher securely in place by means of pivoting, articulating posts, e.g., clamps or clasps, extended upward from the base and fit into a recess on either side of the pitcher, yet allow the blender pitcher to pivot smoothly forward for precisely controlled pouring. Kick Stand would be equipped with a two-speed electric fan which forces air upwards, and designed to quickly dry the glass pitcher in a hands-free manner when the pitcher is locked into the side-clasps of Kick Stand mount and inverted.

Referring to the drawings by numerals of reference there is shown in FIG. 1, accessory stand system 100, i.e., Kick Stand, is disclosed for use with blender stand 101 and blender pitcher 103. Most generally, Kick Stand includes one or more pieces of metal or plastic firmly fixed in an upright position as a stay or support, e.g., post(s) 102, from existing or new blender 101 and a small cylindrical or tapered pin, as of wood or metal, used to fasten, e.g. pegs 104, blender pitcher 103 to post(s) 102 in a multitude of angles or positions.

More specifically, system 100 includes one or more posts 102, e.g., slotted metal or plastic strips, deattachably attach and extend from blender stand 101. Furthermore in system 100, one or more pegs 104 pivotally, deattachably attach along a length of one or more posts 102 and one or more sides of blender pitcher 103. In some embodiments, one or more pegs 104 mate to openings in articulating clamps or clasps, e.g., slotted metal/plastic strips 102, extended upward from blender stand 101.

In some embodiments, articulating clasps or clamps 102 fit into recesses 106 in one or more sides of blender pitcher 103. In some embodiments, one or more locking fasteners 110 integrally connect to one or more pegs 104. For example, locking fasteners 110 secure blender pitcher 103 to one or more posts 102 at pegs 104 in one of multiple positions including pointing upward 112 to load blender pitcher 103 (see FIG. 2), pointing sideways in one of multiple angles 114 to pour blended liquid (see FIG. 3), and pointing downward 116 to enable self-cleaning (see FIG. 4).

Figures 4, 5:
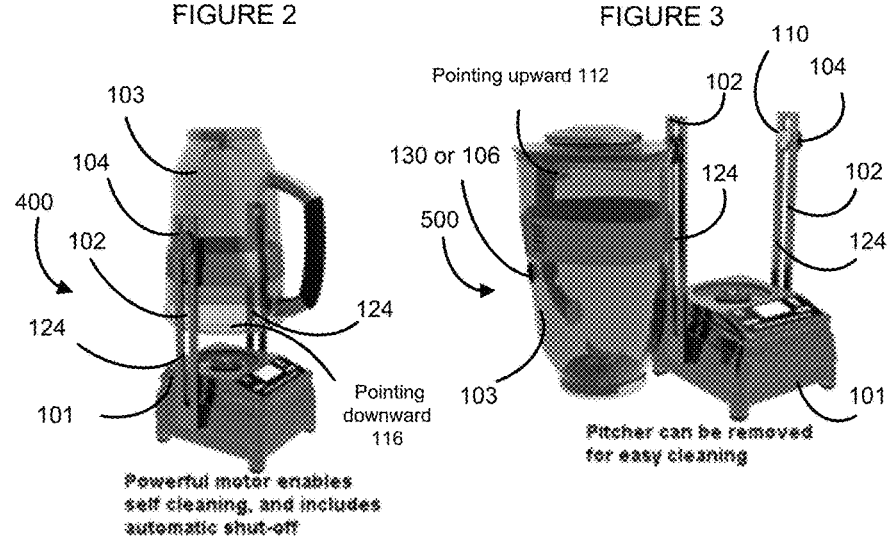
FIG. 4 is a perspective view illustrating pivoting blender pitcher pouring and cleaning accessory, i.e., Kick Stand, in a downwards pouring position for self-cleaning and automatic shut-off according to an embodiment of the present invention of FIG. 1.
FIG. 5 is a perspective view illustrating pivoting blender pitcher pouring and cleaning accessory, i.e., Kick Stand, where the blender pitcher is removed for self-cleaning according to an embodiment of the present invention of FIG. 1.

In some embodiments, one or more pegs 104 allow blender pitcher 103 to be extended into multiple positions 117 including pointing upward 112 (see FIG. 2), pointing sideways 114 (see FIG. 3) and pointing downward 116 (see FIG. 4). One or more pegs 104 allow blender pitcher 103 to be extended upward 112 (see FIG. 2), sideways 114 (see FIG. 3), and downward 116 (see FIG. 4), responsive to at least one of inputs or commands 122 including: user manual input, semi-automatic input commands, and automatic machine generated programming commands. In some embodiments, one or more pegs 104 lock and unlock along multiple positions 117 along a length of one or more posts 102 that are extended.

In some embodiments, one or more adhesive fasteners 130 attach to blender pitcher 103 along one or more sides and configured to integrally attach to one or more pegs 104 that slideably lock along one or more posts 102 extended at one or more positions. Upon reading this specification, it should be appreciated that, under appropriate circumstances, considering such issues as user preferences, design preference, structural requirements, marketing preferences, cost, available materials, technological advances, etc., other blender fastener arrangements such as, for example, threaded fasteners, molding, etc., may be sufficient.

In some embodiments, one or more locking positions 117 are located along one or more posts 102, one or more locking positions 117 configured provide various pouring positions 117 for blender pitcher 103. In one instance, peel-n-stick pivot anchors/posts are affixed to either side of blender pitcher 103 and extended into one or more pairs of terminal fittings of one or more posts 102, wherein accessory stand system 100 provides a peg-and-socket or ball-and-socket configuration.

In some embodiments, fan 118 couples to blender stand 101. In some embodiments, fan 118 is integrated as part of new blender stand 119 (see FIG. 7). Fan 118 operates upon blender pitcher 103 being pointed downward 116 (see FIG. 3) to assist drying of blender pitcher 103 when self-cleaning is enabled. In some embodiments, one or more posts 102 include at least one slot 124 for one or more pegs 104 to slideably attach along a length of one or more posts 104, lock and unlock along the length of one or more posts 102, and rotate about one or more pegs 104 to provide blender pitcher 103 rotational capabilities. For example, rotational capability would include at least one of serve drinks at one or more positional angles 117 (see FIGS. 2, 3, and 4) and dry blender pitcher 103 in a vertically rotated fashion (see FIG. 3), in other words, fan 118 would dry blender pitcher 103 in the vertically rotated fashion.

In some embodiments, Kick Stand, with pitcher, would measure approximately 15 inches in height, approximately 7 inches in width, and approximately 7 inches in depth. The fan would have a High and Low speed, and the fan motor would be powered by batteries or a standard power cord and 110-volt outlet.

Whether incorporated into the design and manufacture of new blenders or offered as an accessory for existing blenders, Kick Stand provides many advantageous as compared to conventional blenders. In one notable interest, Kick Stand would hold and support a heavy glass blender pitcher, permitting user to easily and accurately pour from the pitcher without having to lift and manipulate it. In yet another instance, the pivoting, locking posts of the Kick Stand would hold the inverted blender pitcher securely as the two-speed fan dries it quickly and thoroughly. Thus, inverted blender pitcher innovation relieves the consumer of having to towel-dry the sharp-bladed device at the risk of cutting his or her fingers.

Upon Kick Stand being incorporated in a new blender, Kick Stand features, for example, multiple pouring positions, self-cleaning option, and two-speed fan, would appeal strongly to consumers and distinguish such blenders from those models of competitors. And as an accessory for existing blenders, Kick Stand may save the consumer time and effort in the use of their blender.

Using principles of the present invention, there are many distinct variations of Kickstand. One example would include the stand only, an exemplary embodiment thereof illustrated in text and FIG. 1, would be suitable for use with a wide variety of existing blender pitchers. Another example would be a full-featured electric blender. In this example, the base of which incorporates not only the standard features of premium-quality blenders, but also the pivoting-mount and drying-fan features of the stand.

As illustrated above in FIG. 1, Kick Stand is produced as a stand accessory. In this the stands mounting mechanism is designed as a universal-fit or interchangeable-fit—a single, adjustable mounting mechanism that may accommodate the pitchers of Oster, Vitamix, Waring, and Kitchenmaid. Hamilton Beach, other blenders, or the like, the designs and specifications of which vary. This would be achieved by including a pair of peel-n-stick pivot-anchors, for example, one of which may be affixed to either side of the existing blender pitcher, and into which a pair of terminal fittings on the posts of the Kick Stand may fit and lock together in a peg-and-socket or ball-and-socket configuration.

Figures 2, 3:
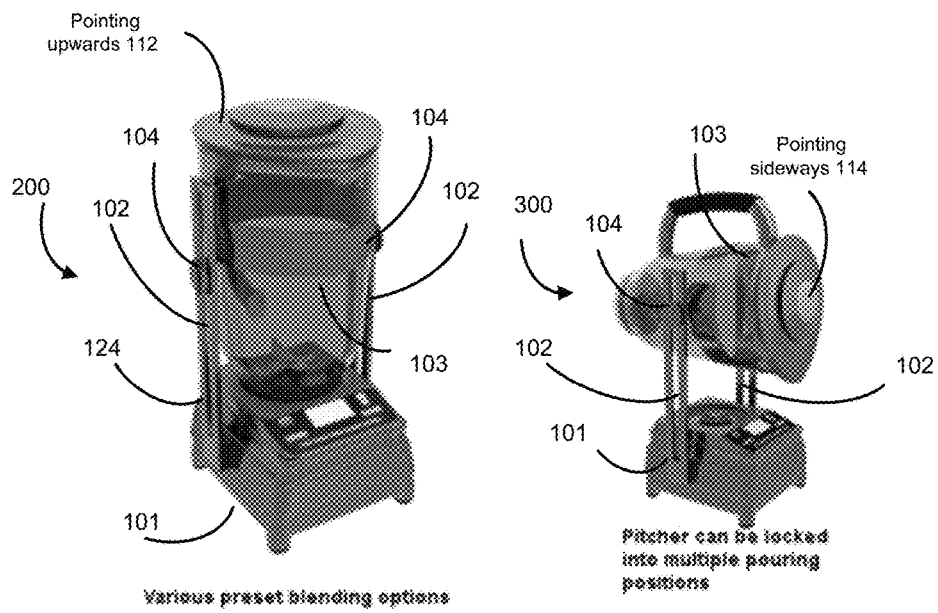
FIG. 2 is a perspective view illustrating pivoting blender pitcher pouring and cleaning accessory, i.e., Kick Stand, in an upwards pointing position according to an embodiment of the present invention of FIG. 1.
FIG. 3 is a perspective view illustrating pivoting blender pitcher pouring and cleaning accessory, i.e., Kick Stand, in a sideways pouring position according to an embodiment of the present invention of FIG. 1.

Referring now to FIG. 2, a perspective view is illustrated of pivoting blender pitcher pouring and cleaning accessory, i.e., Kick Stand, in an upward pointing position according to an embodiment of the present invention of FIG. 1.

Referring now to FIG. 3, a perspective view is illustrated of pivoting blender pitcher pouring and cleaning accessory, i.e., Kick Stand, in a sideways pouring position according to an embodiment of the present invention of FIG. 1.

Referring now to FIG. 4, a perspective view is illustrated of pivoting blender pitcher pouring and cleaning accessory, i.e., Kick Stand, in a downward pointing position for self-cleaning and automatic shut-off according to an embodiment of the present invention of FIG. 1.

Referring now to FIG. 5, a perspective view is illustrated of pivoting blender pitcher pouring and cleaning accessory, i.e., Kick Stand, where the blender pitcher is removed for self-cleaning according to an embodiment of the present invention of FIG. 1.

Figure 6:
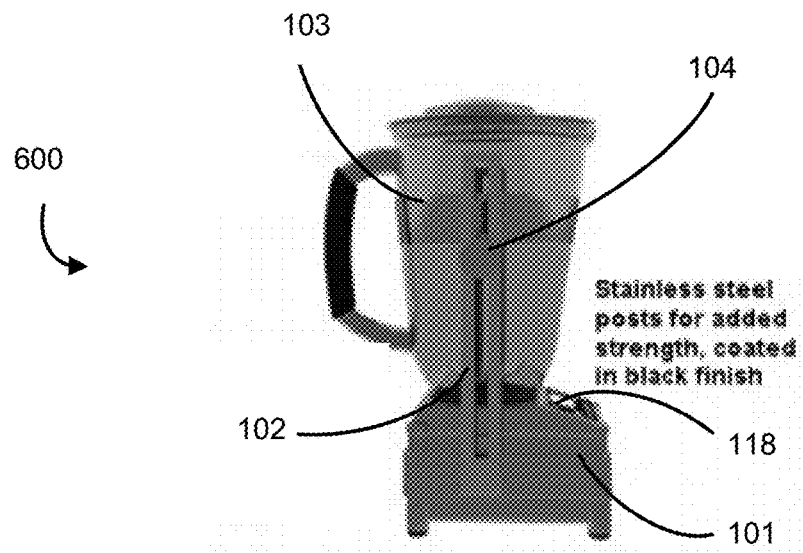
FIG. 6 is a perspective view illustrating pivoting blender pitcher pouring and cleaning accessory, i.e., Kick Stand, where stainless steel posts are added for strength, and coated in black finish according to an embodiment of the present invention of FIG. 1.

Referring now to FIG. 6, a perspective view is illustrated of pivoting blender pitcher pouring and cleaning accessory, i.e., Kick Stand, where stainless steel posts are added for strength, and coated in black finish according to an embodiment of the present invention of FIG. 1.

Figure 7:
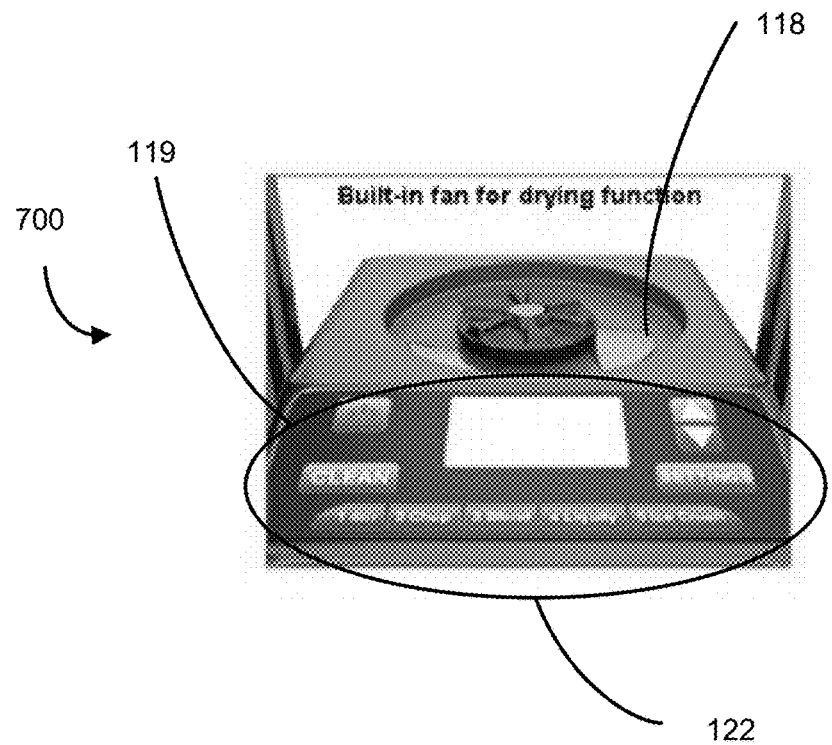
FIG. 7 is a perspective view illustrating pivoting blender pitcher pouring and cleaning accessory, i.e., Kick Stand, with drying fan according to an embodiment of the present invention of FIG. 1.

Referring now to FIG. 7, a perspective view is illustrated of pivoting blender pitcher pouring and cleaning accessory, i.e., Kick Stand, includes a drying fan according to an embodiment of the present invention of FIG. 1.

Figure 8:
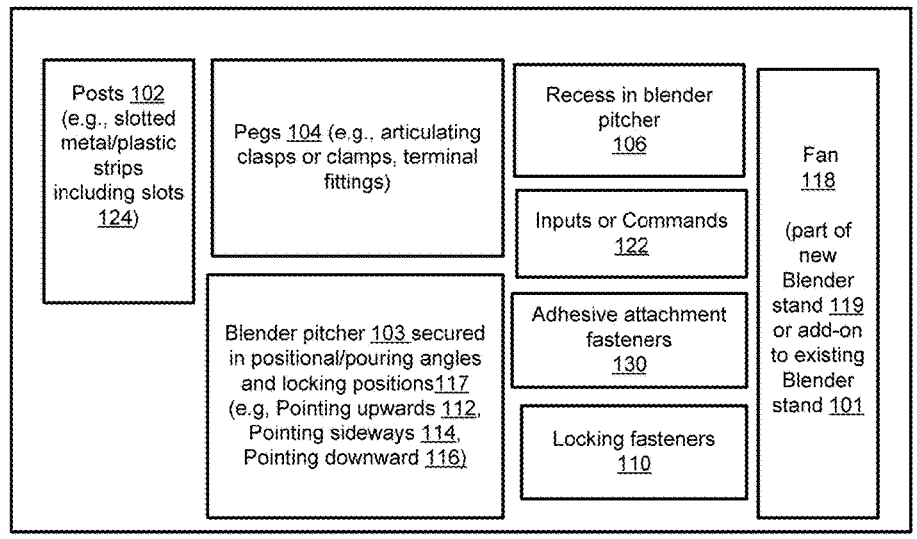
FIG. 8 is a perspective view illustrating a kit for retrofitting an existing blender pitcher and existing/new blender pitcher stand including pivoting blender pitcher pouring and cleaning accessory, i.e., Kick Stand, according to an embodiment of the present invention of FIG. 1.
Figure 8:
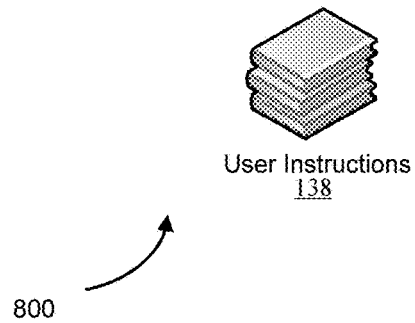

Referring now to FIG. 8, a kit is illustrated for retrofitting an existing blender pitcher and existing and/or new blender pitcher stand with pivoting blender pitcher pouring and cleaning accessory, i.e., Kick Stand, according to an embodiment of the present invention of FIG. 1.

Referring now to FIG. 8, Kick Stand system 100 may be sold as kit 800 comprising the following parts: posts(s) 102, peg(s) 104; fasteners 110, 130; fan 118 installed on existing blender stand and/or integrated with new blender stand 119; and at least one set of user instructions 138. The kit has instructions such that functional relationships are detailed in relation to the structure of the invention (such that the invention can be used, maintained, or the like in a preferred manner). Kick Stand 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 9:
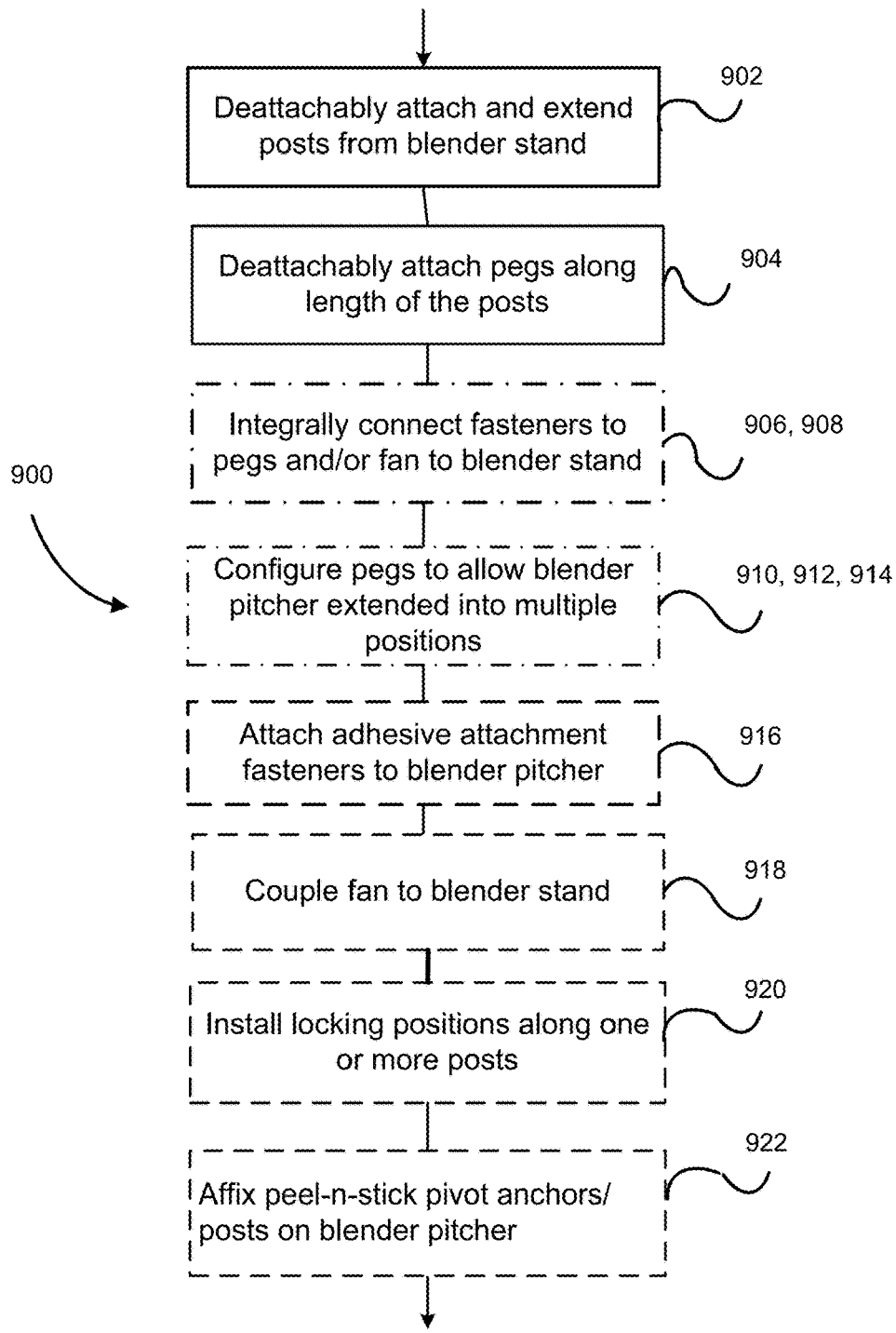
FIG. 9 is a flowchart that illustrates a method retrofitting a existing blender pitcher and blender stand with pivoting blender pitcher pouring and cleaning accessory, i.e., Kick Stand, according to an embodiment of the present invention of FIGS. 1-8.

Referring now to FIG. 9, a flowchart is illustrated for a method retrofitting a blender pitcher and blender stand with pivoting blender pitcher pouring and cleaning accessory, i.e., Kick Stand, according to an embodiment of the present invention of FIGS. 1-8.

Referring now to FIG. 9, method 900 is disclosed of pivoting blender pitcher within blender stand. In method 900, accessory stand system 100 is installed for use with blender stand 101 and blender pitcher 103. In step 902, one or more posts 102 are deattachably attached and extended from blender stand 101. In step 904, one or more pegs 104 are deattachably attached along a length of one or more posts 10 and one or more sides of blender pitcher 103.

In step 906, one or more locking fasteners 110 (See FIG. 5) are integrally connected to one or more pegs 104. Fasteners 110 are configured to secure blender pitcher 103 to one or more posts 102 at pegs 104 in one of multiple positions. In some embodiments, one of multiple positions include: pointing upward 112 to load blender pitcher (see FIG. 2), pointing sideways 114 (see FIG. 3) in one of multiple angles 117 to pour blended liquid, and pointing downward 116 (see FIG. 4) to enable self-cleaning. In step 908, fan 118 is coupled to blender stand 101. In some embodiments, fan 118 is configured to be operational upon blender pitcher 103 being pointed downward 116 (see FIG. 4) to drying of blender pitcher 103 when self-cleaning is enabled.

In step 910, one or more pegs 104 are configured to allow blender pitcher 103 to be extended into multiple positions 117 including pointing upward 112, pointing sideways 114 and pointing downward 116. In step 912, one or more pegs 104 are configured to allow blender pitcher 103 to be extended upward 112 (see FIG. 2), sideways 114 (see FIG. 3) and downward 116 (see FIG. 4). The blender pitcher 103 extensions being responsive to one or more of inputs or commands 122 including: user manual inputs, semi-automatic input commands, and automatic machine generated programming commands. In step 914, one or more pegs 104 lock and unlock along multiple positions along a length of one or more posts 102 that are extended.

In step 916, one or more adhesive attachment fasteners 130 (see FIG. 5) are installed. One or more adhesive fasteners 130 attach to blender pitcher 103 along one or more sides and are configured to integrally attach to one or more pegs 104 that slideably lock along one or more posts 102 extended at one or more positions. In step 918, fan 118 is coupled to blender stand 101 or integrated as part of new blender stand 119. In some embodiments, at least one slot along the length of one or more post 102 is utilized for one or more pegs 104 to: slidably attach along a length of one or more posts 102, lock and unlock along the length of one or more posts 102, and rotate about one or more posts 102 to provide blender pitcher 103 rotational capability. In one example, rotational capability would include at least one of: 1.) serve drinks at one or more positional angles and 2.) dry blender pitcher 103 in a vertically rotated fashion. In one example, fan 118 dries blender pitcher 103 in vertically rotated fashion.

In step 920, one or more locking positions are installed along one or more posts 102. One or more locking positions 117 is configured provide various pouring positions for blender pitcher 103. In step 922, peel-n-stick pivot anchors/ posts are affixed to either side of blender pitcher 103 and extended into one or more pairs of terminal fittings, e.g., mating adapter or holes for pegs 104, on one or more posts 102, wherein accessory stand system 100 provides a peg-and-socket or ball-and-socket configuration.

It should be noted that step 906-922 is/are optional step(s) and may not be implemented in all cases. Optional steps of method 900 are illustrated using dotted lines in FIG. 9 so as to distinguish them from the other steps of method 900.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as user preferences, design preference, structural requirements, marketing preferences, cost, available materials, technological advances, etc., other blender pivoting and rotating arrangements such as, for example, multi-position, blender arrangements, etc., may be sufficient.

Those with ordinary skill in the art will now appreciate that upon reading this specification and by their understanding the art of blender pivoting/rotating arrangements as described herein, methods of blender pivoting and rotating will be understood by those knowledgeable in such art.

What is claimed is new and desired to be protected by Letters Patent is set forth in the appended claims:

1. An accessory stand system for use with a blender stand and blender pitcher comprising:
   one or more posts detachably attached and extended from the blender stand;
   one or more pegs pivotally and detachably attached along a length of the one or more posts and one or more sides of the blender pitcher.

2. The system of claim 1, comprising one or more locking fasteners integrally connected to the one or more pegs, the fasteners configured to secure the blender pitcher to the one or more posts at the one or more pegs in one of multiple positions including at least one of:
   a pointing upward to load the blender pitcher,
   b) pointing sideways in one of multiple angles to pour blended liquid, and
   c) pointing downward to enable self-cleaning.

3. The system of claim 1, comprising a fan coupled to the blender stand, the fan configured to force air through the blender pitcher upon the blender pitcher being pointed downward for drying of the blender pitcher when self-cleaning is enabled.

4. The system of claim 1, the blender pitcher is extendable into multiple positions including pointing upward, pointing sideways and pointing downward while the one or more pegs are attached along the length of the one or posts.

5. The system of claim 1, wherein the one or more pegs are configured to allow the blender pitcher to be extended upward, sideways, and downward, responsive to at least three of user manual inputs, semi-automatic input commands, and automatic machine generated programming commands.

6. The system of claim 1, wherein the one or more pegs lock and unlock along multiple positions along the length of the one or more posts that are extended.

7. The system of claim 4, comprising one or more adhesive attachment fasteners, the one or more adhesive attachment fasteners attached to the blender pitcher along one or more sides and configured to integrally attach to the one or more pegs that slideably lock along the one or more posts extended at one or more positions.

8. The system of claim 1, comprising a fan coupled to the blender stand, and wherein the one or more posts include at least one slot for the one or more pegs to:
   i.) slidably attach along the length of the one or more posts,
   ii.) lock and unlock along the length of the one or more posts, and
   iii.) rotate about the one or more posts.

9. The system of claim 1, comprising one or more locking positions along the one or more posts, the one or more locking positions configured to provide various pouring positions for the blender pitcher.

10. The system of claim 9, comprising peel-n-stick pivot anchors/posts affixed to either side of the blender pitcher and extended into one or more pairs of terminal fittings on the one or more posts, wherein the accessory stand system provides a peg-and-socket or ball-and-socket configuration.

11. A method of pivoting a blender pitcher within a blender stand, the method comprising installing an accessory stand system for use with a blender stand and blender pitcher comprising:
   detachably attaching and extending one or more posts from the blender stand;
   detachably attaching one or more pegs along a length of the one or more posts and one or more sides of the blender pitcher.

12. The method of claim 11, comprising integrally connecting one or more locking fasteners to the one or more pegs, and configuring the fasteners to secure the blender pitcher to the one or more posts at the one or more pegs in one of multiple positions including:

i.) pointing upward to load the blender pitcher, ii.) pointing sideways in one of multiple angles to pour blended liquid, and iii.) pointing downward to enable self-cleaning.

13. The method of claim 11, comprising coupling a fan to the blender stand and activating the fan upon the blender pitcher being pointed downward, wherein said downward position is for drying of the blender pitcher when self-cleaning is enabled.

14. The method of claim 11, including a step of configuring the one or more pegs to position the blender pitcher into multiple positions respectively including at least two of pointing upward, pointing sideways and pointing downward.

15. The method of claim 11, including a step of configuring the one or more pegs to allow the blender pitcher to be extended upward, sideways, and downward, responsive to at least one of user manual inputs, semi-automatic input commands, and automatic machine generated programming commands.

16. The method of claim 11, including a step of locking and unlocking the one or more pegs along multiple positions along the length of the one or more posts that are extended.

17. The method of claim 14, including a step of installing one or more adhesive attachment fasteners, the one or more adhesive fasteners attach to the blender pitcher along one or more sides and configured to integrally attach to the one or more pegs that slideably lock along the one or more posts extended at one or more positions.

18. The method of claim 11, including a step of coupling a fan to the blender stand, and utilizing at least one slot along the length of the one or more posts for the one or more pegs to:

a.) slidably attach along a length of the one or more posts, b.) lock and unlock along the length of the one or more posts, and c.) rotate about the one or more post.

19. The method of claim 11, including a step of installing one or more locking positions along the one or more posts, the one or more locking positions configured provide various pouring positions for the blender pitcher.

20. The method of claim 19, including a step of affixing peel n stick pivot anchors/posts to either side of the blender pitcher which extend into one or more pairs of terminal fittings on the one or more posts, wherein the accessory stand system provides a peg-and-socket or ball-and-socket configuration.

* * * * *